Patented Oct. 1, 1940

2,216,446

UNITED STATES PATENT OFFICE 2,216,446

POLYAZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application May 25, 1939,
Serial No. 275,720

9 Claims. (Cl. 8—48)

This invention relates to azo compounds and to material colored therewith. More particularly it relates to polyazo dyestuffs selected from the group consisting of polyazo compounds having the following general formulae:

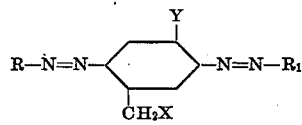

and

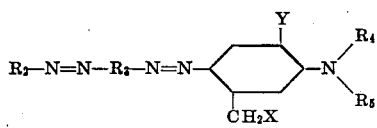

wherein R and $R_1$ each represent a member selected from the group consisting of a benzene nucleus, a naphthalene nucleus, and a heterocyclic nucleus, $R_2$ represents a member selected from the group consisting of a benzene nucleus, a naphthalene nucleus, an azobenzene nucleus, and a heterocyclic nucleus, $R_3$ represents a benzene nucleus, and a naphthalene nucleus, Y represents a member selected from the group consisting of hydrogen, a halogen, an alkyl group, an alkoxy group, a cycloalkyl group, an alkylene group, a phenyl group, and a phenoxy group, $R_4$ and $R_5$ each represent a member selected from the group consisting of hydrogen, an alkyl group, a cycloalkyl group, an aryl group, and a heterocyclic group, and X represents a member selected from the group consisting of a hydroxyl group, an organic ether group, an organic ester group, and a sulphonic acid group wherein the hydrogen may be substituted either by an ammonium radical or by an alkali forming metal.

It is an object, therefore, of this invention to prepare the dyes of the class above described and to color cellulose organic derivatives, wool and silk in the form of threads, yarns, filaments, and fabric materials therewith. In general the polyazo compounds of our invention produce on textile materials colors which show good fastness to light, to washing, and to the action of salt water.

As diazotization components there may be used various aromatic p-amino mono- and polyazo compounds including p-amino azobenzene and p-amino disazobenzene and their substitution products, and particularly the p-amino azo compounds having the general formula:

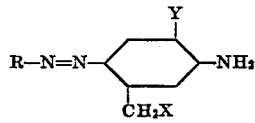

wherein R, Y, and X have the meanings previously defined, which are prepared by coupling the diazo salts of various suitable aromatic amines with para substituted meta-aminobenzyl alcohols and their etherified, esterified, and sulfonated derivatives following in general the procedures of our copending applications Serial No. 147,541, and Serial No. 268,126, of which this invention is a further development.

The following examples illustrate the method of preparation of the polyazo compounds of our invention:

Example 1

22.7 grams of 4-amino-2-hydroxymethyl azobenzene are stirred into 450 c. c. of water, 35 c. c. of hydrochloric acid added, and the mixture cooled to 10° C. followed thereafter by the addition of 36 grams of a 20% solution of sodium nitrite. When diazotization is complete the mixture is added dropwise with stirring to an iced solution of 14.4 grams of methone in sodium carbonate. When coupling is complete, the mixture is filtered, washed and dried. Cellulose acetate is colored orange-yellow shades from aqueous suspensions of the dye.

The disazo compound thus obtained has the formula:

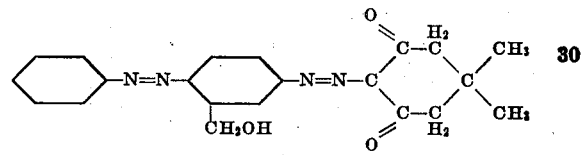

The same process as described above may be used for diazotizing and coupling 2-nitro-2'-hydroxymethyl-4'-amino-5'-methoxy azobenzene with barbituric acid to form the disazo compound:

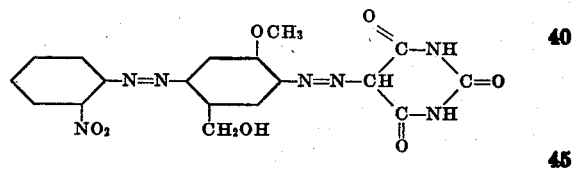

which colors cellulose acetate orange-yellow shades from aqueous suspensions of the dye; and 4-nitro-2'-methoxymethyl-4'- amino - 5'- methyl azobenzene with 1-phenyl-3-methyl-5-pyrazolone to form the disazo compound:

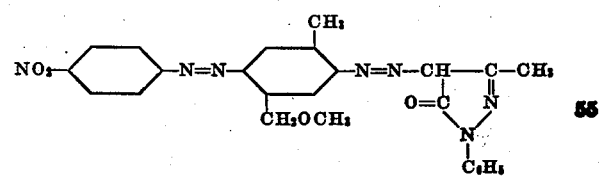

which colors cellulose acetate orange-yellow shades from aqueous suspensions of the dye.

Example 2

31.5 grams of 2-methoxy-2'-acetoxymethyl-4'-amino-5'-ethyl azo benzene are diazotized as described in Example 1. 10.8 grams of p-cresol dissolved in a dilute solution of sodium hydroxide are added slowly with stirring to the diazo mixture. When the coupling reaction is complete, the mixture is made acid to Congo red indicator with mineral acid, and the dye filtered off, washed and dried. Cellulose acetate is colored orange-yellow shades from aqueous suspensions of the dye. The disazo compound thus obtained has the formula:

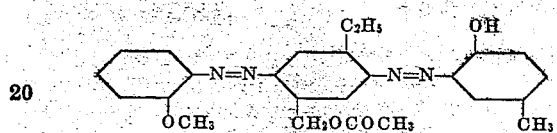

Example 3

33.7 grams of 2-chloro-2'-hydroxymethyl-4'-amino-5'-phenyl azobenzene are diazotized following the procedure of Example 1. 19.5 grams of ethyl-β-hydroxyethyl-m-amino benzyl alcohol are dissolved in dilute hydrochloric acid, ice is added, and the diazo solution stirred into the mixture. After standing for a short time, the reaction mixture is slowly made neutral to Congo red indicator with sodium acetate. When coupling is complete, the dye is filtered off, washed and dried. Cellulose acetate is colored yellowish-orange shades from aqueous suspensions of the dye. The disazo compound thus prepared has the formula:

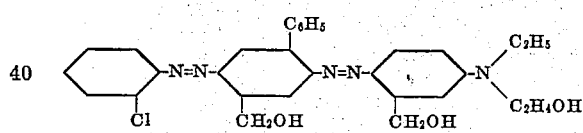

The same process as described above may be used for diazotizing and coupling 4-nitro-2-chloro-2'-β-hydroxyethoxymethyl - 4'- amino - 5'- methoxy azobenzene with 3-β-hydroxyethylamino-4-methoxy benzyl acetate to produce the disazo compound:

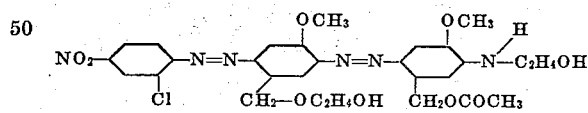

which colors cellulose acetate brownish-rubine shades from aqueous suspensions of the dye; 2, 4 - dinitro - 6 - bromo - 2'- hydroxy-methyl-4'-amino-5'-β-hydroxyethoxy azobenzene with 3-ethyl glycerylamino-benzyl alcohol to produce the disazo compound:

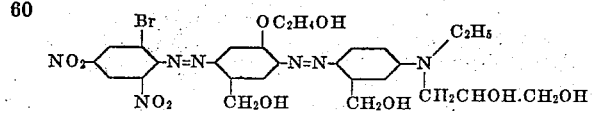

which colors cellulose acetate brownish-rubine shades from aqueous suspensions of the dye; 5-naphthol-azo-p-amino-o-benzyl alcohol with m-ethyl sodium sulfoethylamino benzyl alcohol to produce the disazo compound:

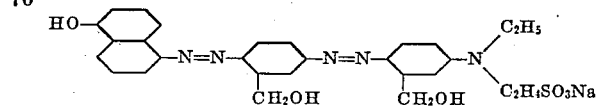

which colors cellulose acetate reddish-blue shades from aqueous suspensions of the dye; and 4-nitro-4'-amino-5'-cyclohexyl-2'-hydroxymethyl azobenzene with 3-butyl sodium sulfatoethylamino-4-methoxy benzyl alcohol to produce the disazo compound:

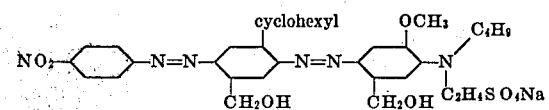

which colors cellulose acetate brownish-rubine shades from aqueous solutions or suspensions of the dye which may contain salt.

Example 4

One mole of methoxybenzothiazole-azo-2-hydroxymethyl-4-aminobenzene is diazotized and coupled with one mole of β-sulfo-ethyl-m-toluidine following the procedure described in Example 3. The disazo compound thus obtained colors cellulose acetate brownish-red shades from aqueous suspensions of the dye, and has the formula:

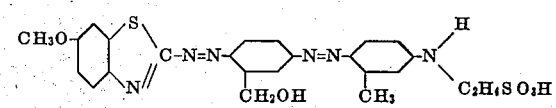

Example 5

0.1 mole of 2-chloro-2'-sodium sulfomethyl-4'-amino azobenzene is dissolved in cold dilute hydrochloric acid, ice added, and mixture diazotized by the addition of 6.9 grams of sodium nitrite. This solution is then added to 0.1 mole of diethylaniline dissolved in cold dilute hydrochloric acid, and the coupling reaction completed by adding sodium acetate. The dye is salted out, filtered and dried. Cellulose acetate is colored orange-red shades from an aqueous solution of the dye which may contain salt. The disazo compound thus obtained has the formula:

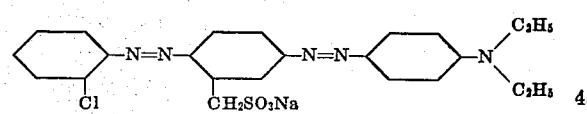

Example 6

0.1 mole of 4-nitro-2'-amino sulfomethyl-4'-amino azobenzene is diazotized and coupled with 0.1 mole of butyl-m-toluidine following the procedure described in Example 5. Cellulose acetate is colored red from an aqueous solution of the dye which may contain salt.

The disazo compound thus obtained has the formula:

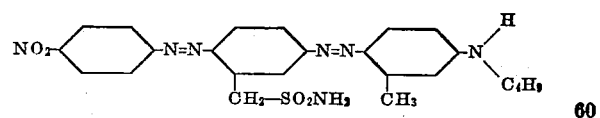

Example 7

0.1 mole of 2-nitro-4-aceto-2'-sodium sulfomethyl-4'-amino-5'-methoxy azobenzene is diazotized and coupled with 0.1 mole of di-β-hydroxyethyl aniline following the procedure described in Example 5. Cellulose acetate is colored a red shade from an aqueous solution of the dye which may contain salt.

The disazo compound thus obtained has the formula:

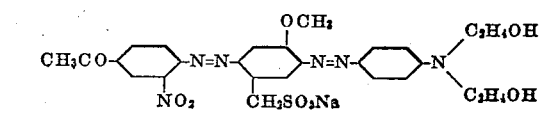

Example 8

One mole of p-amino azobenzene is diazotized with sodium nitrite in a cold dilute hydrochloric acid suspension and one mole of m-amino benzyl alcohol dissolved in cold dilute hydrochloric acid is added. After standing for a short time, the mixture is made neutral to Congo red indicator with sodium acetate. When the coupling reaction is complete, the dye is filtered off, washed and dried. Cellulose acetate is colored an orange shade from aqueous suspensions of the dye.

The polyazo compound thus obtained has the formula:

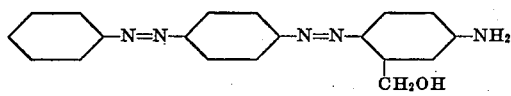

Example 9

One mole of 4-nitro-4'-amino azobenzene is diazotized and coupled with one mole of β-hydroxyethyl-m-amino benzyl alcohol acetate following the procedure described in Example 8.

Cellulose acetate is colored a brownish-red shade from aqueous suspension of the dye. The polyazo compound thus obtained has the formula:

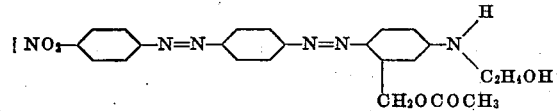

Example 10

One mole of the following disazo compound

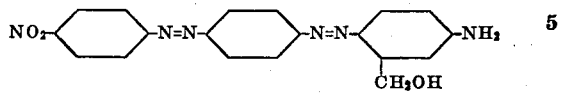

is diazotized with sodium nitrite in a solution of cold dilute hydrochloric acid. One mole of 3-hydroxyethyl phenylphosphatoethyl aminobenzyl methyl ether is dissolved in water and the diazo mixture slowly added. Concurrently with the addition of the diazo salt there is added an aqueous solution of sodium carbonate at such a rate that the mixture is just acid to litmus indicator. When the coupling is complete, the dye is salted out if necessary, filtered and dried. Cellulose acetate is colored a red shade from an aqueous solution of the dye which may contain salt.

The polyazo compound thus obtained has the formula:

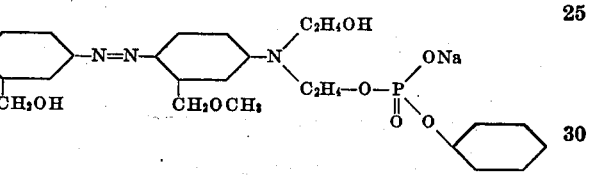

The invention is further illustrated by reference to the following Table A. The compound listed under the heading "Amine" is diazotized and coupled with an equivalent quantity of the specified compound in the column entitled "Coupling component," the dye resulting therefrom coloring cellulose acetate the shades designated.

Table A

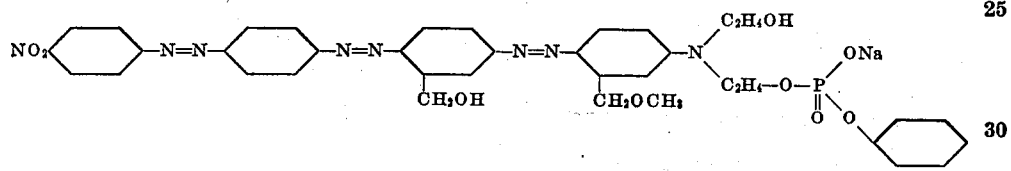

| | Amine | Coupling component | Shade on cellulose acetate |
|---|---|---|---|
| (1) | | Barbituric acid | Orange-yellow. |
| (2) | | do | Do. |
| (3) | | do | Do. |
| (4) | | do | Do. |
| (5) | | do | Do. |
| (6) | | do | Do. |

| Amine | Coupling component | Shade on cellulose acetate |
|---|---|---|
| (7) 2,4-dinitrophenyl azo → 2-ethoxy-4-amino-5-($CH_2OC_2H_4OH$)benzene | Barbituric acid | Orange-yellow. |
| (8) 4-nitrophenyl azo → 2-($CH_2-CH=CH_2$)-4-amino-5-($CH_2OH$)benzene | ___do___ | Do. |
| (9) 4-nitro-2-chlorophenyl azo → 4-amino-3-($CH_2OH$)benzene | ___do___ | Do. |
| (10) 2,4-dinitrophenyl azo → 2-methyl-4-amino-5-($CH_2OH$)benzene | ___do___ | Do. |
| (11) 2-bromo-4-nitro-6-nitrophenyl azo → 2-phenyl-4-amino-5-($CH_2OH$)benzene | ___do___ | Do. |
| (12) 4-nitro-2-sulfophenyl azo → 2-phenyl-4-amino-5-($CH_2OH$)benzene | ___do___ | Do. |
| (13) 4-nitro-2-methylsulfonylphenyl azo → 4-amino-3-($CH_2OH$)benzene | ___do___ | Do. |
| (14) naphthyl azo → 2-methyl-4-amino-5-($CH_2OCOCH_3$)benzene | ___do___ | Do. |
| (15) hydroxynaphthyl azo → 4-amino-3-($CH_2OH$)benzene | ___do___ | Do. |
| (16) methoxy-benzothiazolyl-azo → 4-amino-3-($CH_2OH$)benzene | ___do___ | Do. |
| Amines 1–16 | p-Cresol | Do. |
| Do | m-Toluidine | Do. |
| Do | m-Aminobenzyl alcohol | Do. |
| Do | Dimethyl-aniline | Orange to orange-red. |
| Do | Diphenylamine | Do. |
| Do | Ethyl-β-hydroxyethyl toluidine | Do. |
| Do | Ethyl-β-hydroxyethyl cresidine | Orange to rubine. |
| Do | Ethyl-β-hydroxyethyl-2,5-dimethoxyaniline | Do. |
| Do | Ethyl glyceryl aniline | Orange to red. |
| Do | Ethyl glyceryl-m-toluidine | Orange to rubine. |
| Do | Ethyl glyceryl cresidine | Do. |
| Do | Ethyl glyceryl-m-chloroaniline | Orange. |
| Do | Ethyl glyceryl-α-naphthylamine | Red-violet. |
| Do | Ethyl glyceryl-amino-5-naphthol | Blue. |
| Do | Di-β-hydroxyethyl aniline | Orange-red. |
| Do | Di-β-hydroxyethyl-m-toluidine | Red to rubine brownish tint. |
| Do | Di-β-hydroxyethyl cresidine | Do. |
| Do | β-hydroxyethyl-m-toluidine | Rubine brownish tint. |
| Do | Ethyl sulfoethyl aniline | Orange to red brownish tint. |
| Do | Butyl sulfoethyl aniline | Do. |
| Do | Acetoacetanilide | Orange-yellow. |
| Do | 3-ethylamino-4-methoxy benzyl acetate | Red to rubine brownish tint. |

| Amine | Coupling component | Shade on cellulose acetate |
|---|---|---|
| (17) [structure: phenyl-N=N-phenyl(CH₂SO₃Na)-NH₂] | Barbituric acid | Orange-yellow. |
| (18) [structure: phenyl(NO₂)-N=N-phenyl(CH₃)(CH₂SO₃Na)-NH₂] | ......do...... | Do. |
| (19) [structure: NO₂-phenyl-N=N-phenyl(OCH₃)(CH₂SO₃Na)-NH₂] | ......do...... | Do. |
| (20) [structure: NO₂-phenyl(Br)-N=N-phenyl(CH₂SO₃NH₄)-NH₂] | ......do...... | Do. |
| (21) [structure: NO₂-phenyl(NO₂)-N=N-phenyl(O-cyclohexyl)(CH₂SO₃NH₄)-NH₂] | ......do...... | Do. |
| (22) [structure: NO₂-phenyl(Br)(NO₂)-N=N-phenyl(cyclohexyl)(CH₂SO₃H)-NH₂] | ......do...... | Do. |
| (23) [structure: NO₂-phenyl(NO₂)(NO₂)-N=N-phenyl(CH₂-CH=CH₂)(CH₂SO₃Na)-NH₂] | ......do...... | Do. |
| (24) [structure: naphthyl-N=N-phenyl(cetyl)(CH₂SO₃H)-NH₂] | ......do...... | Do. |
| (25) [structure: phenyl-N=N-phenyl-N=N-phenyl(CH₂SO₃Na)-NH₂] | ......do...... | Do. |
| (26) [structure: NO₂-phenyl(SO₂CH₃)-N=N-phenyl(CH₂SO₃Na)-N=N-phenyl(CH₃)-NH₂] | ......do...... | Do. |
| (27) [structure: NO₂-phenyl(CH₃)-N=N-phenyl(CH₂SO₄NH₄)-N=N-phenyl(CH₂SO₃Na)-NH₂] | ......do...... | Do. |
| (28) [structure: CH₃O-benzothiazole-C-N=N-phenyl(O-CH₂-CH(CH₂-CH₂-O-CH₂)...)(CH₂SO₃Na)-NH₂] | ......do...... | Do. |
| Amines 17-28 | Methone | Do. |
| Do | 1-phenyl-3-methyl-5-pyrazolone | Do. |
| Do | p-Cresol | Do. |
| Do | Diphenylamine | Orange to rubine. |
| Do | Cresidine | Do. |
| Do | α-naphthylamine | Do. |
| Do | Cetyl-m-toluidine | Do. |
| Do | Cetyl-β-hydroxyethyl-m-anisidine | Do. |
| Do | Cyclohexyl-m-chloraniline | Orange to red. |
| Do | Oleyl-β-sulfoethyl-m-amino benzyl-alcohol | Red to rubine. |
| Do | Di-β-hydroxyethylaniline | Do. |
| Do | Di-β-hydroxyethyl-m-toluidine | Do. |
| Do | 1-β-hydroxyethyl-amino-5-naphthol | Red-blue. |
| Do | β-methoxyethyl-tetrahydrofurfuryl-2,5-dimethoxy-aniline | Red to wine. |

| Amine | Coupling component | Shade on cellulose acetate |
|---|---|---|
| Amines 17-28 | [structure with $OC_2H_5$, H, $CH_3$, N, $C_2H_4OCO$ cetyl] | Red to rubine. |
| Do | [structure with $OCH_3$, $OCH_3$, $C_2H_4OCOCH_3$, N, $C_3H_6OCOC_6H_5$ ($\beta$ or $\alpha$)] | Red to wine. |
| (29) [phenyl-N=N-phenyl-$NH_2$] | m-Ethylamino-benzyl alcohol | Red. |
| (30) [$NO_2$-phenyl(Cl)-N=N-phenyl($CH_3$)-$NH_2$] | m-Butyl sodium sulfo-ethylamino-benzyl methyl ether. | Do. |
| (31) [$NO_2$-phenyl-N=N-naphthyl-$NH_2$] | m-Hydroxyethyl ammonium sulfatoethylamino-benzyl alcohol. | Violet. |
| (32) [HO, Cl-phenyl-N=N-phenyl($CH_3$)-$NH_2$] | m-Ethyl glycerylamino-benzyl alcohol. | Do. |
| (33) [$NO_2$-phenyl($SO_2H$)-N=N-phenyl($CH_3$, $OC_4H_9$)-$NH_2$] | m-Cetyl hydroxyethylamino-benzyl alcohol | Rubine. |

The polyazo compounds of our invention may also be prepared by an alternative procedure which differs substantially from the preceding. This process illustrated diagrammatically below comprises the steps of diazotizing a nitro aminobenzyl alcohol (I) and coupling it with a coupling component $R_1$ to form the azo compound (II) which is reduced to the amino compound (III) followed by re-diazotization and re-coupling with the coupling component R to form the disazo compound (IV):

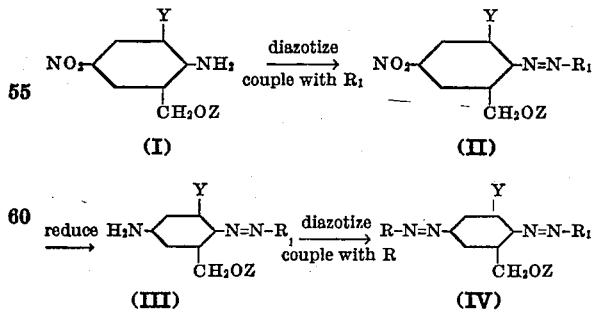

wherein R, $R_1$, and Y have the same meanings as previously designated, and Z represents hydrogen, an alkyl group, and an acyl group. The following example illustrates the process more specifically.

*Example 11*

16.8 grams of 2-amino-5-nitro benzyl alcohol are placed in 200 c. c. of water with 40 c. c. of hydrochloric acid and diazotized at 5–15° C. with 6.9 grams of sodium nitrite. The diazo mixture is then stirred into an iced solution of 18.1 grams of di-$\beta$-hydroxyethyl aniline in dilute hydrochloric acid. When the coupling reaction is complete, the mixture is neutralized with sodium acetate, the dye filtered out, washed and dried. Cellulose acetate is colored orange shades from aqueous suspensions of the dye.

The azo compound thus obtained has the formula:

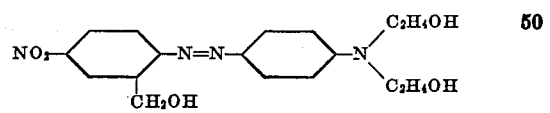

The reduction step of the process comprises suspending approximately 30 grams of the above azo compound in 500 c. c. of water heated to 60–65° C. and then adding a solution of 50 grams of fused sodium sulfide in 100 c. c. of water stirring being continued for at least an hour. After the mixture has cooled to room temperature, the dye is filtered off and washed with water. The reduced product has the formula:

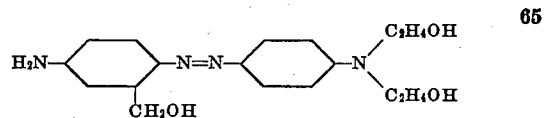

The re-diazotization and re-coupling step of the process comprises diazotizing approximately 28 grams of the above azo compound and coupling it with an equivalent quantity of a coupler of the benzene series following in general the procedures already described for diazotization and coupling. The disazo compounds thus obtained have the general formula:

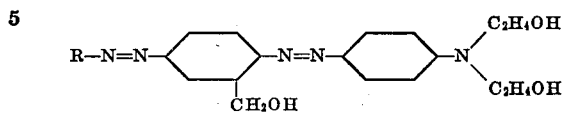

and constitute valuable dyestuffs for the coloration of organic derivatives of cellulose. Obviously the hydroxyl groups may be etherified or esterified if desired during some step of the process or after the formation of the disazo compound.

The following Table B discloses a number of diazotization and coupling components which may be combined in the manner designated to form the nitro azo compounds of the first step of the above described process. It is to be understood that the azo compounds thus formed may be subjected to the other steps of the process including reduction to the corresponding amine and re-diazotization and re-coupling with a benzene coupler to form the disazo compounds of our invention.

Another alternative procedure for the preparation of the polyazo compounds of our invention consists of the steps of reducing the azo compounds (I), which may be prepared by the method of our copending application Serial No. 147,541, to the corresponding amines (II), diazotizing the latter compounds and then coupling them with coupling components represented by $R_2$ to form the polyazo compounds (III):

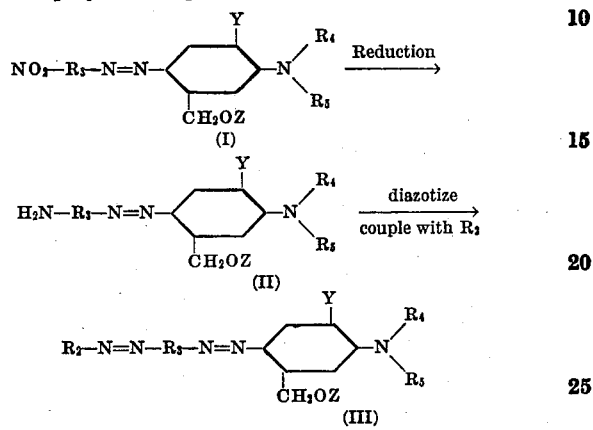

Table B

| Amine | Coupling component | Shade on cellulose acetate |
|---|---|---|
| $NO_2$—⟨⟩—$NH_2$, $CH_2OCOCH_3$ | (1) Ethyl-β-hydroxyethyl aniline | Orange. |
| $NO_2$—⟨Cl⟩—$NH_2$, $CH_2OH$ | (2) Barbituric acid | Green-yellow. |
| Do | (3) 5,5-Me₂-cyclohexandione-1,3 | Do. |
| Do | (4) p-Cresol | Do. |
| Do | (5) 1-phenyl-3-methyl-5-pyrazolone | Orange-yellow. |
| Do | (6) Dimethylaniline | Red. |
| Do | (7) β-hydroxyethyl aniline | Brown-red. |
| Do | (8) Di-β-hydroxyethyl aniline | Do. |
| Do | (9) β-hydroxyethyl cresidine | Do. |
| $NO_2$—⟨Cl⟩—$NH_2$, $CH_2OH$ | (10) 1-β-hydroxyethyl-amino-5-naphthol | Blue. |
| Do | (11) Ethyl-β-hydroxyethyl-m-toluidine | Red. |
| Do | (12) β-hydroxyethyl-m-toluidine | Brown to rubine. |
| $NO_2$—⟨Br⟩—$NH_2$, $CH_2OC_2H_4OCH_3$ | Couplers 2-12 | Same shades. |
| $NO_2$—⟨⟩—$NH_2$, $CH_2OCH_3$ | Couplers 2-5 | Do. |
| Do | (13) Di-β-hydroxyethyl-2-ethoxy-5-chloroaniline | Orange. |
| Do | (14) Ethyl methyl-m-chloroaniline | Orange-yellow. |
| $NO_2$—⟨Cl⟩—$NH_2$, $CH_2OCOCH_3$ | Couplers 6-8 | Same shades. |
| $NO_2$—⟨$NO_2$⟩—$NH_2$, $CH_2OH$ | (15) Glyceryl cresidine | Violet. |
| Do | (16) Di-β-hydroxyethyl-m-toluidine | Do. |
| Do | (17) Di-β-hydroxyethyl-α-naphthylamine | Blue. |
| Do | (18) 1-β-hydroxyethylamino-5-naphthol | Blue-green. | wherein $R_2$, $R_3$, Y, $R_4$, $R_5$, and Z have the meanings previously defined.

The latter process of obtaining the polyazo compounds of the invention may be illustrated by the following example.

*Example 12*

27.6 grams of p-nitrobenzene-azo-dimethylamino-m-benzyl alcohol are suspended in 500 c. c. of water heated to 60–65° C. A solution of 50 grams of fused sodium sulfide in 100 c. c. of water is added and stirring continued for at least an hour. After the mixture has cooled to room temperature the dye is filtered off and washed with water. Cellulose acetate is colored yellow shades from aqueous suspensions of the dye. The amino azo compound thus obtained has the formula:

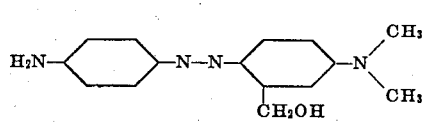

This compound may then be diazotized and coupled with various suitable coupling components to form the polyazo compounds desired following in general the processes of Examples 1–4.

The following table still further illustrates the kind of azo compounds which may be obtained by the reduction step of the above described process, it being understood in each case that these amino azo compounds can be diazotized and coupled in the usual manner with suitable coupling components of the $R_2$ type.

*Table C*

(1) – (7) [structures as shown]

(8) 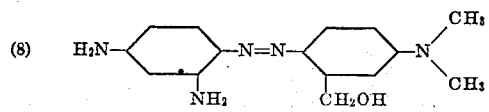

(9) 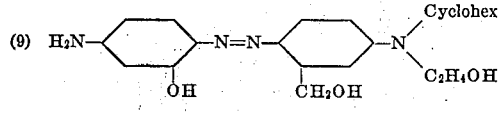

(10) 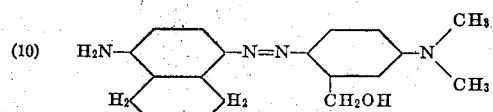

(11) 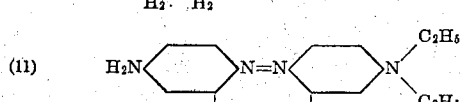

Textile materials made of or containing organic derivatives of cellulose and particularly cellulose acetate in the form of threads, yarns, filaments, and fabrics may be colored by the polyazo compounds of our invention either by direct processes of dyeing with the completed dyestuffs or by impregnation of the materials with the aminoazo or aminopolyazo intermediates, diazotizing thereon, and then developing the final colors on the fibers with the selected coupling components. It is to be understood, of course, that the aminoazo and aminopolyazo intermediates are in themselves valuable dyestuffs for coloring cellulosic materials. The polyazo compounds containing a sulfomethyl group on an aryl nucleus are in addition to being valuable dyes for cellulose derivatives, also valuable dyes for coloring wool and silk.

The following example illustrates the process of developing the polyazo compounds of our invention directly on the fiber.

*Example 13*

100 grams of a cellulose acetate fabric is dyed a deep yellow color at 80–85° C. in 2 liters of water containing 1 gram of finely dispersed dye having the formula:

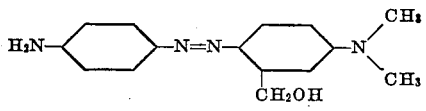

The fabric is washed and then immersed for 20–30 minutes in a bath containing 3 grams per liter of sodium nitrite and 6 c.c. of hydrochloric acid whereby the amine contained in the fiber is converted to the diazo salt. The cloth is rinsed and developed to a black shade by treatment with an aqueous dispersion of β-hydroxynaphthoic acid maintained at a pH value of about 4 to 6. If in place of β-hydroxynaphthoic acid, there is used 1-amino-5-naphthol a blue shade is obtained. The developers are not restricted specifically to just β-hydroxy naphthoic acid and to 1-amino-5-naphthol, since satisfactory colors may also be obtained on cellulose acetate silk with their substitution products and derivatives including the acid methyl ester, the acid amide, and the alkyl and aryl substituted acid amides of β-hydroxy naphthoic acid, and the 1-amino-5-naphthols wherein at least one of the hydrogens of each amino group is substituted by an alkyl or acyl group.

In the direct dyeing with the finished polyazo dyestuff, it will be found that many of these dyes are water-soluble so that they may be applied in aqueous solutions without the necessity of employing a dispersing or solubilizing agent. In this case the dyeing will be conducted in accordance with the usual dyeing practice, salt being added if desired to facilitate the exhaustion of the dye bath. For a more detailed description as to how the water-soluble polyazo dyes of our invention may be employed for the coloration of cellulosic materials, reference may be had to our U. S. Patent No. 2,107,898 issued February 8, 1938. Where the particular polyazo compound is water-soluble, the dye will ordinarily be applied to the material in the form of an aqueous suspension which can be prepared by grinding the dye to a paste in the presence of a sulfonated oil, soap or other suitable dispersing agent and dispersing the resulting paste in water. Dyeing operations can advantageously be conducted at a temperature of 80–85° C., but any suitable temperature may be used. Upon completion of the dyeing operation, the cellulosic material is removed, washed with soap, rinsed and dried.

Typical organic derivatives of cellulose include the hydrolyzed as well as the unhydrolyzed cellulose organic acid esters and cellulose mixed organic acid esters such as cellulose acetate, cellulose formate, cellulose propionate, cellulose butyrate, cellulose acetate-propionate, cellulose acetate-butyrate, and cellulose ethers such as methyl cellulose, ethyl cellulose, and benzyl cellulose.

The expression "alkyl" as used throughout the specification and claims, unless otherwise specified, is intended to mean the unsubstituted alkyl groups such as methyl, ethyl, propyl, butyl and the like, as well as their substitution products such as mono- and polyhydroxyalkyl groups, and the etherified, esterified, sulfonated, and sulfated mono- and polyhydroxyalkyl groups, the more common examples of such substituted groups including hydroxyethyl, dihydroxypropyl, methoxyethyl, ethoxyethyl, acetoxyethyl, sulfoethyl, and sulfatoethyl among others.

The expression "sulfo" group as used throughout the specification and claims, unless otherwise specified is intended to mean the free acid group—

as well as its derivatives such as the quaternary salts formed therewith, and the salts formed by the substitution of the hydrogen therein by an ammonium radical or an alkali forming metal.

We claim:
1. The polyazo dye compounds selected from the group consisting of polyazo compounds having the general formulae:

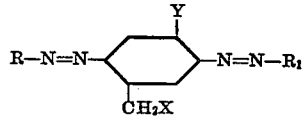

and

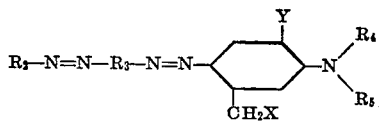

wherein R represents a member selected from the group consisting of a benzene nucleus, a naphthalene nucleus, and a benzothiazole nucleus; $R_1$ represents a member selected from the group consisting of a benzene nucleus, a naphthalene nucleus, a barbituric acid nucleus, and a pyrazolone nucleus, $R_2$ represents a member selected from the group consisting of a benzene nucleus, a naphthalene nucleus, an azobenzene nucleus, and a benzothiazole nucleus, $R_3$ represents a member selected from the group consisting of a benzene nucleus, and a naphthalene nucleus, Y represents a member selected from the group consisting of hydrogen, a halogen, an alkyl group, an alkoxy group, a cycloalkyl group, an alkylene group, a phenyl group, and a phenoxy group, $R_4$ and $R_5$ each represent a member selected from the group consisting of hydrogen, an alkyl group, a cycloalkyl group, an aryl group of the benzene series, and a furyl group, and X represents a member selected from the group consisting of a hydroxyl group, an alkoxy group, an acyloxy group, and a sulfo group.

2. The polyazo dye compounds having the general formula:

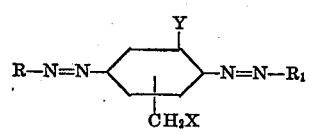

wherein R represents a member selected from the group consisting of a benzene nucleus, a naphthalene nucleus, and a benzothiazole nucleus, $R_1$ represents a member selected from the group consisting of a benzene nucleus, a naphthalene nucleus, a barbituric acid nucleus, and a pyrazolone nucleus, Y represents a member selected from the group consisting of hydrogen, a halogen, an alkyl group, an alkoxy group, a cycloalkyl group, an alkylene group, a phenyl group, and a phenoxy group, and X represents a hydroxyl group, an alkoxy group, an acyloxy group, and a sulfo group.

3. The polyazo dye compounds having the general formula:

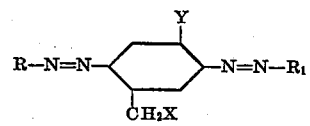

wherein R represents a member selected from the group consisting of a benzene nucleus, a naphthalene nucleus, and a benzothiazole nucleus, $R_1$ represents a member selected from the group consisting of a benzene nucleus, a naphthalene nucleus, a barbituric acid nucleus, and a pyrazolone nucleus, Y represents a member selected from the group consisting of hydrogen, a halogen, an alkyl group, an alkoxy group, a cycloalkyl group, an alkylene group, a phenyl group, and a phenoxy group, and X represents a hydroxyl group, an alkoxy group, an acyloxy group, and a sulfo group.

4. The polyazo dye compounds having the general formula:

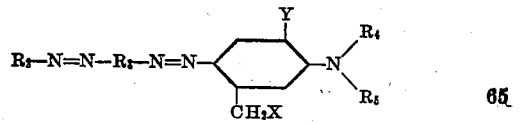

wherein $R_2$ represents a member selected from the group consisting of a benzene nucleus, a naphthalene nucleus, an azobenzene nucleus, and a benzothiazole nucleus, $R_3$ represents a member selected from the group consisting of a benzene nucleus, and a naphthalene nucleus, Y represents a member selected from the group consisting of hydrogen, a halogen, an alkyl group, an alkoxy group, a cycloalkyl group, an alkylene group, a phenyl group, and a phenoxy group, R₄ and R₅ each represent a member selected from the group consisting of hydrogen, an alkyl group, a cycloalkyl group, an aryl group of the benzene series, and a furyl group, and X represents a member selected from the group consisting of a hydroxyl group, an alkoxy group, an acyloxy group, and a sulfo group.

5. The polyazo dye compounds selected from the group consisting of polyazo compounds having the general formulae:

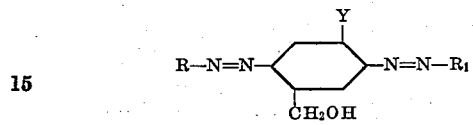

and

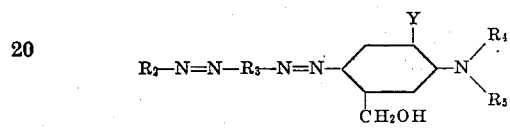

wherein R represents a member selected from the group consisting of a benzene nucleus, a naphthalene nucleus, and a benzothiazole nucleus, R₁ represents a member selected from the group consisting of a benzene nucleus, a naphthalene nucleus, a barbituric acid nucleus, and a pyrazolone nucleus, R₂ represents a member selected from the group consisting of a benzene nucleus, a naphthalene nucleus, an azobenzene nucleus, and a benzothiazole nucleus, R₃ represents a member selected from the group consisting of a benzene nucleus, and a naphthalene nucleus, Y represents a member selected from the group consisting of hydrogen, a halogen, an alkyl group, an alkoxy group, a cycloalkyl group, an alkylene group, a phenyl group, and a phenoxy group, R₄ and R₅ each represent a member selected from the group consisting of hydrogen, an alkyl group, a cycloalkyl group, an aryl group of the benzene series, and a furyl group.

6. The polyazo dye compounds selected from the group consisting of polyazo compounds having the general formulae:

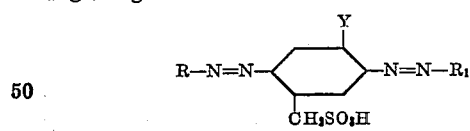

and

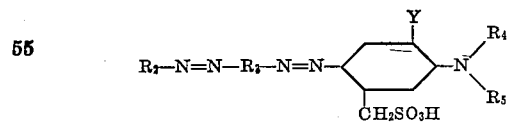

wherein R represents a member selected from the group consisting of a benzene nucleus, a naphthalene nucleus, and a benzothiazole nucleus, R₁ represents a member selected from the group consisting of a benzene nucleus, a naphthalene nucleus, a barbituric acid nucleus, and a pyrazolone nucleus, R₂ represents a member selected from the group consisting of a benzene nucleus, a naphthalene nucleus, an azobenzene nucleus, and a benzothiazole nucleus, R₃ represents a member selected from the group consisting of a benzene nucleus, and a naphthalene nucleus, Y represents a member selected from the group consisting of hydrogen, a halogen, an alkyl group, an alkoxy group, a cycloalkyl group, an alkylene group, a phenyl group, and a phenoxy group, and R₄ and R₅ each represent a member selected from the group consisting of hydrogen, an alkyl group, a cycloalkyl group, an aryl group of the benzene series, and a furyl group.

7. Material made of or containing an organic derivative of cellulose colored with a polyazo dye compound selected from the group consisting of polyazo compounds having the general formulae:

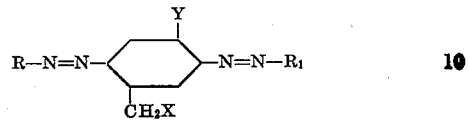

and

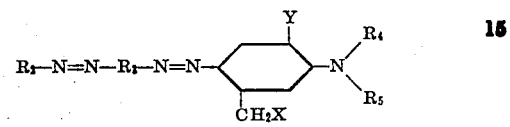

wherein R represents a member selected from the group consisting of a benzene nucleus, a naphthalene nucleus, and a benzothiazole nucleus, R₁ represents a member selected from the group consisting of a benzene nucleus, a naphthalene nucleus, a barbituric acid nucleus, and a pyrazolone nucleus, R₂ represents a member selected from the group consisting of a benzene nucleus, a naphthalene nucleus, an azobenzene nucleus, and a benzothiazole nucleus, R₃ represents a member selected from the group consisting of a benzene nucleus, and a naphthalene nucleus, Y represents a member selected from the group consisting of hydrogen, a halogen, an alkyl group, an alkoxy group, a cycloalkyl group, an alkylene group, a phenyl group, and a phenoxy group, R₄ and R₅ each represent a member selected from the group consisting of hydrogen, an alkyl group, a cycloalkyl group, an aryl group of the benzene series, and a furyl group, and X represents a member selected from the group consisting of a hydroxyl group, an alkoxy group, an acyloxy group, and a sulfo group.

8. Material made of or containing cellulose acetate colored with a polyazo dye compound selected from the group of polyazo compounds having the general formulae:

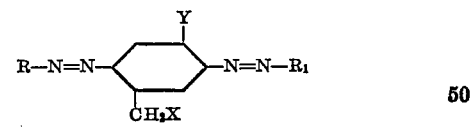

and

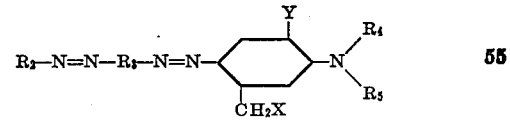

wherein R represents a member selected from the group consisting of a benzene nucleus, a naphthalene nucleus, and a benzothiazole nucleus, R₁ represents a member selected from the group consisting of a benzene nucleus, a naphthalene nucleus, a barbituric acid nucleus, and a pyrazolone nucleus, R₂ represents a member selected from the group consisting of a benzene nucleus, a naphthalene nucleus, an azobenzene nucleus, and a benzothiazole nucleus, R₃ represents a member selected from the group consisting of a benzene nucleus, and a naphthalene nucleus, Y represents a member selected from the group consisting of hydrogen, a halogen, an alkyl group, an alkoxy group, a cycloalkyl group, an alkylene group, a phenyl group, and a phenoxy group, R₄ and R₅ each represent a member selected from the group consisting of hydrogen, an alkyl group, a cycloalkyl group, an aryl group of the benzene series, and a furyl group, and X represents a member selected from the group consisting of a hydroxyl group, an alkoxy group, an acyloxy group, and a sulfo group.

9. The process of producing dischargeable dyeings on cellulose acetate silk which comprises dyeing it with a dye selected from the group consisting of azo compounds having the general formulae:

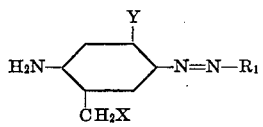

and

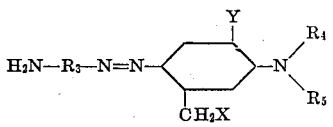

wherein $R_1$ represents a member selected from the group consisting of a benzene nucleus, a naphthalene nucleus, a barbituric acid nucleus, and a pyrazolone nucleus, $R_3$ represents a member selected from the group consisting of a benzene nucleus, and a naphthalene nucleus, Y represents a member selected from the group consisting of hydrogen, a halogen, an alkyl group, an alkoxy group, a cycloalkyl group, an alkylene group, a phenyl group, and a phenoxy group, $R_4$ and $R_5$ each represent a member selected from the group consisting of hydrogen, an alkyl group, a cycloalkyl group, an aryl group of the benzene series, and a furyl group, and X represents a member selected from the group consisting of a hydroxyl group, an alkoxy group, an acyloxy group, and a sulfo group, diazotizing the dye on the fiber and developing it with a member selected from the group consisting of a β-hydroxy naphthoic acid, and a 1-amino-5-naphthol.

JAMES G. McNALLY.
JOSEPH B. DICKEY.

CERTIFICATE OF CORRECTION.

Patent No. 2,216,446. October 1, 1940.

JAMES G. McNALLY, ET AL.

It is hereby certified that error appears in the printed specification of the above numbered patent requiring correction as follows: Page 9, first column, line 11, for "water-soluble" read --water-insoluble--; and that the said Letters Patent should be read with this correction therein that the same may conform to the record of the case in the Patent Office.

Signed and sealed this 4th day of February, A. D. 1941.

(Seal)

Henry Van Arsdale,
Acting Commissioner of Patents.